United States Patent Office 3,025,235
Patented Mar. 13, 1962

3,025,235
FLUID LOSS CONTROL AGENT FOR DRILLING MUDS
Norman H. Smith and Kenneth Russell Gray, Shelton, Wash., assignors to Rayonier Incorporated, Shelton, Wash., a corporation of Delaware
No Drawing. Filed July 17, 1958, Ser. No. 749,068
4 Claims. (Cl. 252—8.5)

This invention relates to lignosulfonates resulting from the sulfite digestion of wood, and has for its object the provision of an improved drilling mud comprising a fluid loss control agent formed from lignosulfonates. More particularly, the invention is concerned with drilling muds comprising a fluid loss control agent obtained by heating an aqueous solution of lignosulfonate, such as a spent sulfite digestion liquor, in the presence of ammonium ions under particular conditions to form a modified lignosulfonate product having increased viscosity while maintaining solubility, especially in dilute alkaline aqueous solutions. The improved lignosulfonate product used in the invention is formed under critically controlled processing conditions and is very effective in controlling fluid loss in gas and oil well drilling operations without adversely affecting other properties of the drilling mud and particularly in the case of low pH calcium contaminated drilling muds sometimes known as "hard water" and "gyp" muds.

It has been proposed heretofore to heat aqueous solutions of spent sulfite digestion liquors in the presence of ammonia in order to solidify them into substantially water-insoluble solids. Such products lack the solubility and other characteristics needed for utility in drilling muds.

In accordance with this invention, a spent sulfite liquor, containing ammonia or to which an ammonium salt has been added, is heated at an elevated temperature under certain controlled conditions to a point where the product has a high viscosity and is on the verge of passing over into a water and alkali insoluble solid or gel. Our invention is based on the discovery that we can produce in this narrow range of conditions a product that has amazing properties as a fluid loss control agent in drilling muds. The product is reasonably soluble in low or medium concentrations in water and is soluble in dilute aqueous caustic solutions such as are encountered in hard water or contaminated drilling muds. The improved lignosulfonate product is a partially consolidated ammonium-containing lignosulfonate product having a viscosity in excess of 100,000 centipoises measured at 25° C. and a 23 percent total solids content.

One of the most important properties of oil-well drilling muds is their ability to seal the walls of the borehole with a thin, impermeable layer of clay. This prevents loss of fluid to the formation, and helps to control gas or water flows which can gas-cut, contaminate or cut down the density of the mud used. Various additives have been used to improve the properties of drilling muds in this respect, including starch, carboxymethyl-cellulose, hydrolyzed polyacrylonitrile, and various natural gums. However, these products all suffer from one or more of the following disadvantages:

(1) They increase the viscosity and gel strengths of the muds to which they are added.
(2) They are not stable at high temperatures.
(3) They are subject to fermentation.

It was surprising to find that the modified lignosulfonate product has the peculiar property to serve as an effective fluid-loss control agent in drilling muds without having any objectionable adverse effect on the viscosity and gel strength of the drilling mud. Moreover, it is stable at high temperatures and is not subject to fermentation.

In carrying out a process of the invention for the production of our modified lignosulfonate product we take a spent sulfite pulping liquor from the digestion of wood and heat it under carefully controlled conditions in the presence of ammonia or a related ammonium compound until the viscosity and solubility of the lignosulfonate ammonia mixture has reached the desired point. The heating is then stopped and the water removed, as by evaporation or spray drying. The product thus formed will be a solid having a dark-brown or black color.

In practical commercial operations it is important to observe certain conditions in its preparation. These include the temperature and length of time at which the mixture is heated, the solids content of the mixture and pH thereof during heating, the nature and amount of ammonium compound used with the lignosulfonate, and the presence of sugars in the mixture.

The foregoing conditions are interdependent and must be carefully controlled if an effective fluid loss agent is to be obtained. The speed with which the viscosity of the modified lignosulfonate product rises to the stage where it forms an effective fluid loss control agent increases with reaction temperature, solids concentration and as the pH is lowered while the extent of the reaction depends upon the time as modified thereby. The ammonium ions must be present within fairly narrow limits, too little not serving to condense the lignosulfonate sufficiently and too much promoting excessive condensation and leading to insolubility, both of which will make the product ineffective as a fluid loss control agent. Ammonia and ammonium salts seem to be suitable as the source of said ammonium ion. The wood sugars which are normally present in a spent sulfite liquor must remain in the lignosulfonate liquor being treated if it is to attain the desired effectiveness as a fluid loss control agent.

As a general guide, the following are the preferred operating conditions:

Temperature _____ 150 to 275° C.
Time _____ 4 to 180 mins.
Concentration (total solids) _____ 20 to 50%.
Ammonia (or equivalent) _____ 1 to 10% (based on solids).
pH at start of heating _____ 1 to 9.

In connection with the foregoing limits, it should be pointed out that they are variable and interdependent. Since the stage in the over-all reaction at which an effective fluid loss agent is formed is extremely narrow, it is necessary to choose one or two of the variables within the given limits and then adjust the others accordingly For example, it will be noted in Table I that when the ammonia-base spent sulfite liquor was heated at 180° C. for 90 minutes an effective fluid loss control agent was formed only at a pH of 7.4 and a total solids content of 45%. When the solids content was changed to 30% the desired product was formed at a pH of from 3 to 5. Table II again shows that when using an ammonia-base spent liquor and holding the pH and temperature constant, the effective fluid loss control agents were formed in about 50 minutes at a total solids content of 46% and in from 110 to 130 minutes at a total solids content of 23%. The effect of temperature is demonstrated by Table V, where it appears that it took only 4 to 6 minutes to form an effective product at temperatures of 250 to 265° C. under the given conditions of concentration and pH as compared to about 90 minutes in previous examples at 180° C. Such high temperatures require much care in controlling the other variables.

Conventional ammonia-base spent liquors ordinarily contain sufficient ammonium ions and will not require the addition of any further amounts. With other types of spent sulfite liquors we have found the reaction to proceed properly when suitable amounts of ammonia or ammonium salts are added. These facts are illustrated in Table IV.

The presence of wood sugars in the spent sulfite liquor has an important effect on the processing reactions. This was demonstrated by dialyzing off the ammonia and sugars from ammonia-base spent sulfite liquors and subjecting separate portions thereof to testing as reported in Table VI.

The following tests were made on ammonium- and alkali metal-base spent sulfite liquors (SSL) resulting from digesting hemlock wood by conventional practices to illustrate the properties of products formed under different processing conditions.

The fluid loss control properties of the products, as set out in Examples I through VI which follow, were all determined according to the methods prescribed in API Recommended Practice Standard Field Procedure for Testing Drilling Fluids RP 29, Fourth Edition May 1957 (Section III).

Each test was run using a hard water base and made up by adding 39 gms. $CaSO_4$; 18.5 gms. $MgSO_4$; 46.6 gms. $Na_2SO_4$; 22.2 gms. NaCl; 6000 gms. of a native California clay to 12,600 gms. of water. This base mud when mixed is representative of a highly contaminated drilling mud whose fluid loss properties are very difficult to control.

To obtain the fluid loss values, tests were run by adding the equivalent of 3 lbs./bbl. of additive to a sample of the foregoing base mud and stirring the mixture with a high speed mixer for 5 minutes, aging it overnight at 160° F., remixing it, and then testing the sample by the standard procedures of the American Petroleum Institute as given above. A typical example of the benefits to be obtained by use of the products of the invention is given in the following table.

TABLE A

| Additive | Amt. added lbs./bbl. | Viscosity cp. | 0-gel | 10-min. gel | Fluid-loss ml./30 min. |
| --- | --- | --- | --- | --- | --- |
| Base mud | [1] 0 | 11 | 7 | 12 | 36 |
| Ammonia-base SSL solids | 3 | 10 | 6 | 9 | 35.5 |
| Ammonia-base SSL solids (heat-treated per invention) | 3 | 11 | 6 | 11 | 14.1 |

[1] Control.

*Example I*

THE EFFECT OF VARYING pH AND TOTAL SOLIDS

In this example, a sample of a conventional ammonium-base spent sulfite cooking liquor was divided into two portions. The total solids content of one portion (A) was adjusted to 30% and the total solids content of the other (B) to 45%. Aliquots of A and B were then adjusted to the pH's indicated in the following table, and heated at 180° C. for 90 minutes after which the resulting products were cooled and dried. The products thusly obtained were tested in the given hard water drilling mud as to their effectiveness for fluid loss control agents.

TABLE I

| pH | | Brookfield visc. of product, cps. | | Fluid loss, ml./30 min. | |
| --- | --- | --- | --- | --- | --- |
| A | B | A | B | A | B |
| 3.0 | 3.0 | Over 10⁵ | Solid (insoluble) | 16.6 | 39.0 |
| 4.2 | 3.7 | do | Solid (partly sol.) | 15.4 | 38.5 |
| 5.1 | 4.4 | do | do | 17.0 | 37.5 |
| 6.1 | 5.2 | 4900 | do | 22.6 | 38.0 |
| 7.1 | 5.9 | 2200 | do | 23.8 | 35.5 |
| 8.1 | 6.6 | 340 | do | 30.0 | 29.5 |
| 8.6 | 7.4 | 360 | Solid (soluble) | 29.0 | 15.8 |
| 8.9 | 8.1 | 115 | Syrup | 30.0 | 23.3 |
| 9.2 | 8.8 | 56 | do | 32.5 | 28.5 |
| 9.6 | 9.6 | 34 | do | 31.0 | 30.5 |
| 10.3 | 10.3 | 22 | do | 32.0 | 29.5 |
| ---- | 11.0 | | do | ---- | 33.5 |

*Example II*

THE EFFECT OF VARYING TIME AND TOTAL SOLIDS

In this example, a sample of an ammonium-base spent liquor was divided into two portions. The total solids content of one (A) was adjusted to 23% and that of the other (B) to 46%. The pH of A was 1.7 and that of B was 1.3. Aliquots of each portion were then heated at 180° C. for times ranging from 0 to 130 minutes. The products thusly obtained were tested in the hard water mud as to their effectiveness as fluid loss control agents, and the results listed in the following tabulation:

TABLE II

| Time in minutes (same both samples) | Brookfield visc. of product, cps. | | Fluid loss, ml./30 mins. | |
| --- | --- | --- | --- | --- |
| | A | B | A | B |
| 0 | 6 | 220 | 35.0 | 34.0 |
| 30 | 7 | 3,100 | 34.5 | 33.0 |
| 50 | 6 | Over 10⁵ | 36.0 | 19.6 |
| 70 | 7.5 | Insol. solids | 35.0 | 34.1 |
| 90 | 29 | do | 22.6 | 34.5 |
| 110 | Over 10⁵ | do | 10.6 | 34.0 |
| 130 | do | do | 10.6 | 33.0 |

*Example III*

THE EFFECT OF ADDING AMMONIUM ION TO A SODIUM BASE SPENT LIQUOR

In this example a sample of a conventional sodium-base spent liquor was procured and the total solids content adjusted to 30% and the pH to 6.0. The sample was then divided into 12 parts and the indicated percentages of ammonia added as ammonium chloride thereto based on the weight of solids in said liquor. After addition of the ammonia, each portion of the liquor was heated to 180° C. for 90 minutes. The products obtained in this manner were then tested for their effectiveness as fluid loss control agents in the aforementioned hard water drilling mud and the results tabulated below:

TABLE III

| Percent ammonia (based on B.D. weight of solids) | Brookfield visc. of product, cps. | Fluid loss, ml./30 mins. |
| --- | --- | --- |
| 0.05 | 17 | 35 |
| 0.10 | 18 | 34.5 |
| 0.16 | 16 | 34.5 |
| 0.24 | 16 | 34 |
| 0.38 | 17 | 35 |
| 0.64 | 21 | 34 |
| 0.95 | 26 | 34 |
| 1.60 | 320 | 33 |
| 2.4 | Over 10⁵ | 26.4 |
| 3.8 | do | 12.2 |
| 5.7 | do | 25.2 |
| 8.0 | do | 38.0 |

The effectiveness of ammonium-ion addition depends upon additional factors besides the quantity of ammonia added, as is illustrated by the following results. Aliquots of the foregoing sodium-base spent liquor were treated and tested as follows:

(a) The total solids content was adjusted to 50 percent and the pH to 6.0 whereupon 1 percent ammonium-ion, based on the weight of the solids in said liquor, was added as $NH_4Cl$ and the mixture heated at 180° C. for 60 minutes. The product thus obtained was tested for effectiveness in the given hard water mud and produced a mud having a fluid loss of only 21.5 ml./30 mins., as compared with a control sample value of 33–34 ml./30 mins., under the conditions used in the preceding table.

(b) The total solids of a second aliquot was adjusted to 20 percent and the pH to 5.0, whereupon 10 percent ammonium-ion based on the total solids in said liquor was added as $NH_4Cl$ and the mixture heated at 180° C. for 70 minutes. The product thus obtained was tested in the same hard water drilling mud as before and yielded a fluid loss value of only 25.8 ml./30 mins., as compared to a control sample value of 38 ml./30 mins. under the conditions used in Table III.

*Example IV*

THE EFFECT OF VARIOUS AMMONIUM COMPOUNDS, ETC.

In this example a sample of a conventional sodium-base spent liquor was divided into five portions after the total solids content had been adjusted to 40% and the pH to approximately 6. Various amounts of the indicated chemicals were added thereto and the several portions were then heated to 180° C. for 90 minutes each. The products obtained in this manner were then tested for their effectiveness as fluid loss control agents in a hard water drilling mud, and the results tabulated below.

TABLE IV

| Liquor Base | Chemical added and amount (percent $NH_3$ on solids) | Form of product | Fluid loss, ml./30 mins. |
|---|---|---|---|
| Sodium | None—Control | Liquid | 39.0 |
| Do | $NH_4OH$, 0.2 | do | 37.5 |
| Do | $NH_4Cl$, 1.6 | Gel | 11.4 |
| Do | $(NH_4)_2SO_4$, 1.3 | do | 16.8 |
| Do | $(NH_4)_2SO_4$, 1.6 | Solid (soluble) | 11.8 |

Spent liquors regardless of base can be used as raw material for the preparation of the fluid loss control agents of the present invention. In the following table the effectiveness of such agents prepared from sodium, magnesium and calcium base spent sulfite liquors are compared. Samples of each type of liquor were adjusted to a total solids content of 30 percent and heated at 180° C. for 90 minutes after addition of the indicated amounts of the given ammonium-ion yielding compounds and at the indicated pH's. The same hard water base mud was used as before.

TABLE IV (A)

| Spent liquor base | Chemical added | Amount (percent ammonium ion) | pH | Condition of product | Fluid loss, ml./30 mins. |
|---|---|---|---|---|---|
| Sodium | $(NH_4)_2SO_3$ | 4.0 | 4.0 | Gel | 16.0 |
| Magnesium | $NH_4Cl$ | 3.8 | 6.5 | Gel (soft) | 14.5 |
| Calcium | $NH_4Cl$ | 3.8 | 4.6 | Gel | 13.5 |

*Example V*

THE EFFECT OF ELEVATED TEMPERATURES

In this example a sample of a conventional ammonium-base spent sulfite liquor was divided into two parts after the total solids had been adjusted to 30%. The pH of one portion was adjusted to 4.7 and that of the other to 7.5. Aliquots of each portion were then heated at the given temperatures for the indicated times, after which the products thus obtained were tested in the given hard water drilling mud for their effectiveness as fluid loss control agents.

TABLE V

| Time, minutes | Temp., ° C. | pH | Sample condition | Fluid loss, ml./30 mins. |
|---|---|---|---|---|
| 1.0 | 370 | 4.7 | Fluid | 39.0 |
| 1.5 | 350 | 4.7 | do | 23.0 |
| 5.0 | 260 | 4.7 | Solid | 14.8 |
| 7.0 | 210 | 4.7 | Fluid | 31.0 |
| 4.0 | 265 | 7.5 | Gel | 12.0 |
| 6.0 | 250 | 7.5 | do | 16.2 |
| 10.0 | 240 | 7.5 | do | 18.8 |

*Example VI*

THE NECESSITY FOR WOOD SUGARS IN THE STARTING MATERIAL

In this example a sample of conventional ammonium-base spent liquor was dialyzed to remove the free ammonia and the usual wood sugars. The dialyzed liquor was then divided into four portions after the total solids were adjusted to 25% and the pH to 7.0. Each of the four portions was heated to 180° C. for 90 minutes after the addition of the indicated chemicals. The products thus obtained were then tested in the given hard water drilling mud for their effectiveness as fluid loss control agents. A further sample of the original undialyzed spent liquor at a pH of 7.5 and a total solids content of 30% was treated in the same manner after the addition of 20% of glucose to determine the effect of adding a sugar to the liquid without removing the original wood sugars.

TABLE VI

| Type of liquor used | $(NH_4)_2SO_3$ added (percent $NH_3$ on solids) | Glucose added (percent on solids) | Product condition | Fluid, ml./30 mins. |
|---|---|---|---|---|
| Dialyzed | None | None | Fluid | 36.0 |
| Do | 1.4 | None | Soft-gel | 37.0 |
| Do | None | 20.0 | do | 39.0 |
| Do | 1.4 | 20.0 | Gel | 12.8 |
| Undialyzed | None | 20.0 | Solid | 11.0 |

*Example VII*

A sample of sodium-base spent sulfite liquor was evaporated and spray dried. Part of this material was dissolved to form a 40% solution, adjusted to pH 6.0 with sodium hydroxide, and solid $NH_4Cl$ was dissolved in this solution equivalent to 5% on the spent liquor solids. This mixture was then heated for 90 minutes at 180° C. During this time, the maximum pressure resulting was 205 p.s.i.g. and on cooling after the reaction period a residual pressure of 65 p.s.i.g. remained. The product was a solid which was dried on a steam bath. A small amount of residual moisture was removed in a vacuum oven.

Another portion of the dried spent sulfite liquor was treated in the same manner as above, except that no $NH_4Cl$ was added.

A third portion of the dried spent sulfite liquor was tested without any further treatment.

TABLE VII

Drilling mud tests were carried out in exactly the same manner as described in the paragraph preceding Example I. The results are given below:

| Additive | Amt. added, lb./bbl. | Viscosity, cp. | 0-gel | 10-min. gel | Fluid loss, ml./30 mins. |
|---|---|---|---|---|---|
| Base mud | | 11 | 7 | 12 | 36 |
| Na base SSL | 3 | 11 | 4 | 8 | 39 |
| Na base SSL heated without NH$_3$ at pH 6 | 3 | 11 | 3 | 6 | 38 |
| Na base SSL heated with 5% NH$_4$Cl at pH 6.0 | 3 | 11 | 4 | 7 | 11.4 |

A large batch of gypsum containing mud, usually called "Gyp Mud," was prepared by mixing 2500 grams of a low yield California clay (P-95) and 2500 grams of a Texas shale clay (Rev. Dust) with 250 grams of Control-gel in 15 liters of distilled water for 30 minutes. Before use the mud was aged overnight at 70° C. and remixed 15 minutes. The fluid loss agent was prepared by taking another portion of the same conventional sodium-base spent sulfite liquor as that used in Table IV, adding 1.6% (NH$_4$)$_2$SO$_4$ (based on NH$_3$) thereto and heating the mixture at 180° C. for 90 minutes, etc. In the so-called "Gyp Mud" test, the fluid loss agent of our invention was added to the foregoing mud at the rate of 4 lbs./bbl., along with 5 lbs./bbl. gypsum and 0.4 lb./bbl. of sodium hydroxide. The fluid loss (ml./30 mins.) for the mud without the fluid loss agent was 39.0 and with it was 10.5. In sample 5 of Table IV, it will be noted that the comparative treatment on a hard water mud lowered the fluid loss to 11.8.

We claim:
1. An aqueous drilling mud comprising an hydratable clay dispersed in water and about one-half to ten pounds per barrel of a fluid loss control product which is formed by heating concentrated spent sulfite digestion liquor containing from 20% to 50% of dissolved solids in the presence of ammonium ions equivalent to from 1 to 10% of ammonia at a pH of from 1 to 9, at a temperature of from 150° to 275° C. for from 4 to 180 minutes, said product having a viscosity in excess of 100,000 centipoises measured at 25° C. and 23 percent total solids and which is soluble in dilute sodium hydroxide solutions, said product being present in an amount sufficient to reduce fluid loss very substantially.
2. A drilling mud according to claim 1 which is a hard water drilling mud.
3. A drilling mud according to claim 1 which is contaminated with a salt of the group consisting of a calcium salt and a magnesium salt.
4. A drilling mud according to claim 1 which is a low pH calcium contaminated drilling mud.

References Cited in the file of this patent

UNITED STATES PATENTS

| | | |
|---|---|---|
| 2,491,436 | Barnes | Dec. 13, 1949 |
| 2,674,575 | Lewis et al. | Apr. 6, 1954 |
| 2,822,358 | Hearon et al. | Feb. 4, 1958 |
| 2,831,022 | Van Blaricom et al. | Apr. 15, 1958 |
| 2,858,271 | Byrd | Oct. 28, 1958 |
| 2,935,504 | King et al. | May 3, 1960 |